May 12, 1964 K. FEDERN 3,132,519
ROTOR JOURNALLING DEVICE
Filed April 10, 1959 2 Sheets-Sheet 1

May 12, 1964　　K. FEDERN　　3,132,519
ROTOR JOURNALLING DEVICE
Filed April 10, 1959　　2 Sheets-Sheet 2

United States Patent Office 3,132,519
Patented May 12, 1964

3,132,519
ROTOR JOURNALLING DEVICE
Klaus Federn, Darmstadt, Germany, assignor to Carl Schenck Maschinenfabrik G.m.b.H., Darmstadt, Germany, a corporation of Germany
Filed Apr. 10, 1959, Ser. No. 805,638
5 Claims. (Cl. 73—471)

My invention relates to an essentially rigid bearing structure with force measuring gages for journalling a rotating workpiece in dynamic balancing machines, materials testing machines and other machinery in which the rotor being journalled is to be capable of tumbling motion about the center point of the main journalling axis, whereas the bearing structure is to be rigidly prevented from rotary motion about that axis as well as from any displacement along the axis. In such journalling devices, the bearings proper are mounted on a rigid support by means of structure which, while bendingly elastic, is rigidly stiff to pulling and compressing forces. Journalling devices of this type are known from my Patent 2,869,936 assigned to the assignee of the present invention.

It is an object of my invention to improve journalling devices of the above-mentioned type toward a simpler and more compact design than attainable when supporting the journal bearing by a group of spring rods as used in the known devices; and it is also an object of the invention to improve the rotor journalling devices with respect to the mounting and accurate operation of the force-responsive measuring gages.

According to my invention, I support the rotor bearing of the journalling device relative to the rigid support or frame structure by means of two symmetrical spring members of generally annular shape concentric to the bearing axis, each of said members forming a frusto-conical structure convexly related to the other and having its geometric apex coincident with the center point of the bearing axis.

In the novel journalling structure the force or deflection measuring gages are mounted on the annular and frusto-conical spring members for the purpose of sensing, in each radial journalling plane of the rotor, the forces, particularly centrifugal forces, transmitted from the rotor during its rotation upon the journalling structure. According to a more specific feature of the invention, the measuring gages are so arranged on the annular spring members as to respond only to forces transmitted to the spring members in a radial direction irrespective of any tumbling moments simultaneously stressing the spring members, in order to permit determining such radial forces as regards their angular position and magnitude.

A journalling structure according to the invention, in comparison with similarly operating devices previously known, has the advantage of affording a greatly simplified manufacture due to the fact that the bearing body proper as well as the spring members of the journalling structure are combined to a single rotationally symmetrical component which can be produced simply by cutting tools, or which after being machined can be assembled to form a single structural unit.

According to still another feature of the invention, the cross section of the annular spring members is reduced at a number of localities distributed in concentric, preferably symmetrical, relation to the center point of the rotor bearing. The localities of reduced cross section are formed, for example, by bores or radial slots which impart to the journalling structure, in each journalled plane of the rotor, a desired resiliency with respect to stresses about a transverse axis of the journalled rotor.

A journalling device with such locally weakened spring members, supporting the bearing proper, is mainly suitable for the journalling of rotors in balancing or other testing machines that are to operate at relatively high speed of specimen rotation, such as at supercritical speed, in which the rotor axis no longer behaves as a rigid structure but may be subjected to bending elastic deformation. It will be understood that in balancing and other machines for measuring unbalance-responsive oscillatory forces or deflections in two or more radial reference planes, a journalling structure according to the invention is to be provided at each of the journalling points or planes of the rotor.

The foregoing and further objects, advantages and features of my invention will be apparent from the following description in conjunction with the drawings showing three embodiments of journalling devices according to the invention by way of example.

Figure 1:
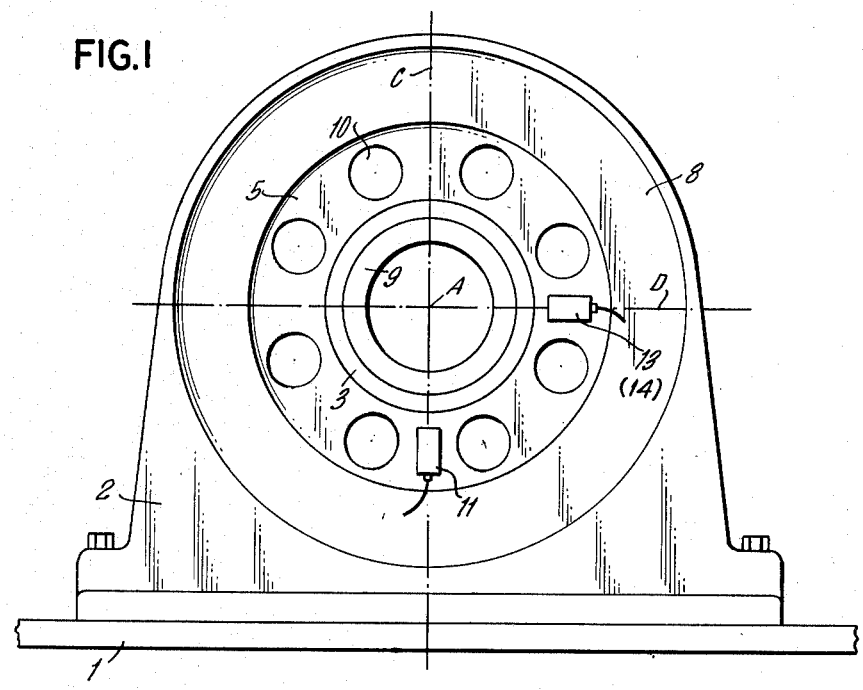
FIG. 1 is an axial view of a first journalling structure of which an axial cross section along line C is shown in FIG. 2, the bearing proper and the spring members in this embodiment being combined to a single structural part.
Figure 2:
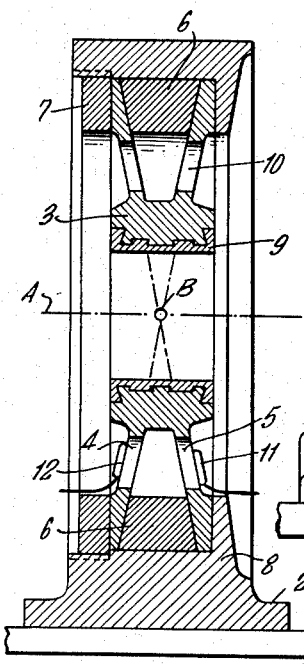

As shown in FIGS. 1 and 2, a rigid supporting structure 2, firmly mounted on the base structure 1 of the machine, has a cylindrical center opening concentric to the main axis A of the journal. Mounted in the cylindrical opening and firmly secured to the supporting structure 2 is the bearing portion 3, together with two disc-shaped metallic spring members 4 and 5 which in this embodiment form a single structural unit together with the bearing proper. The two spring members 4 and 5 form respective frusto-conical structures whose respective extended geometric apexes coincide with the center point B (FIG. 2) of the bearing, the geometric extension being indicated by dash-dot lines in FIG. 2. The two spring members extend from bearing 3 outwardly and away from each other on opposite sides respectively, of the horizontal center plane of the bearing 3. That is, each spring member may be looked upon as being convex relative to the other.

A diametrically subdivided spacer ring 6 is inserted between the peripheral portions of the two spring members for rigidly mounting these portions in the supporting structure 2. The spacer ring 6 and the spring members are pressed against an annular shoulder 8 of the supporting structure 2 by means of a nut 7 whose outer periphery is in threaded engagement with a neck portion of the supporting structure. The nut 7 permits sufficiently pre-stressing the assembly of spring members to maintain their connection with the supporting structure rigid under all operating conditions.

The bearing body 3 is provided with a lining 9 of bearing metal but, if desired, may also serve to receive the outer race of an anti-friction bearing, or may directly form the race member of such a bearing.

In order to make the journalling structure at each journalling point of the rotor particularly resilient with respect to stresses about a transverse axis, the spring members are provided with bores 10 which are regularly distributed about the bearing axis. The force measuring gages of the journalling structure consist of strain gages of variable electric resistance, the strip-shaped individual gages being denoted by 11, 12, 13 and 14. Gages 11 and 13 are mounted on spring member 5. Gages 12 and 14 are mounted on spring member 4. The gages 11, 12 are located in a radial plane C, and gages 13, 14 in a plane D extending at a right angle to plane C. This arrangement of the gages permits them to respond to radial forces transmitted by the bearing 3 upon the spring members, the measuring result remaining unaffected by any tumbling moments as may also impose a stress upon the spring members.

Figure 3:
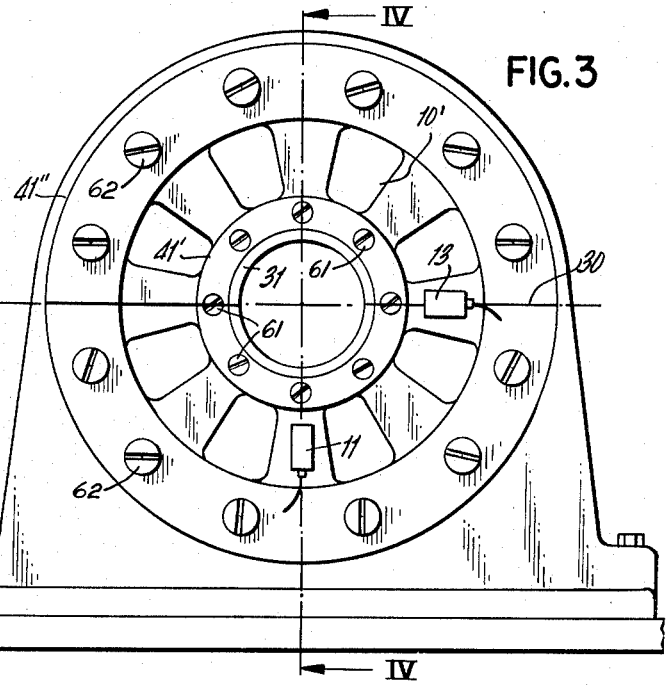
FIG. 3 is an axial view of a second embodiment of which an axial cross section along line IV—IV is shown in FIG. 4, the bearing body and the spring members in this embodiment being designed as separate parts respectively.
Figure 4:
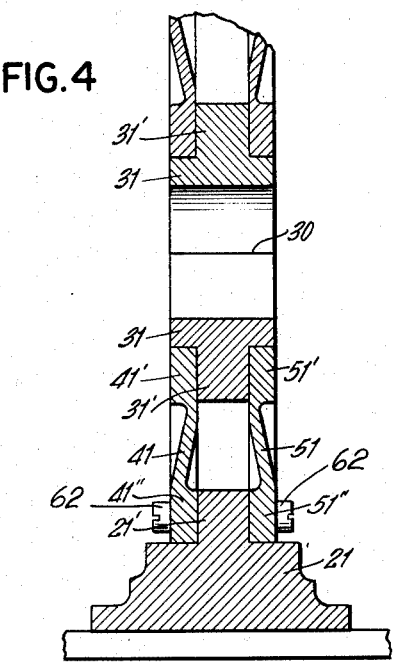

In the embodiment of FIGS. 3 and 4, the supporting structure 21 of the journalling device and the bearing body 31 proper are each provided with an annular projection 21' and 31' and are diametrically subdivided, the division line being denoted by 30. Each spring member 41, 51 bulges from projection 21' inwardly toward projection 31' substantially in accordance with the shape of a truncated cone. Each spring member is provided with an inner reinforced ring portion 41', 51', and an outer reinforced ring portion 41'', 51'' which are securely fastened to the projection 31' and projection 21' respectively by means of screws 61 and 62 (FIG. 3). Each spring member is provided with a number of radial slots 10' serving the same purpose as the above mentioned bores 10 (FIGS. 1, 2).

Figure 5:
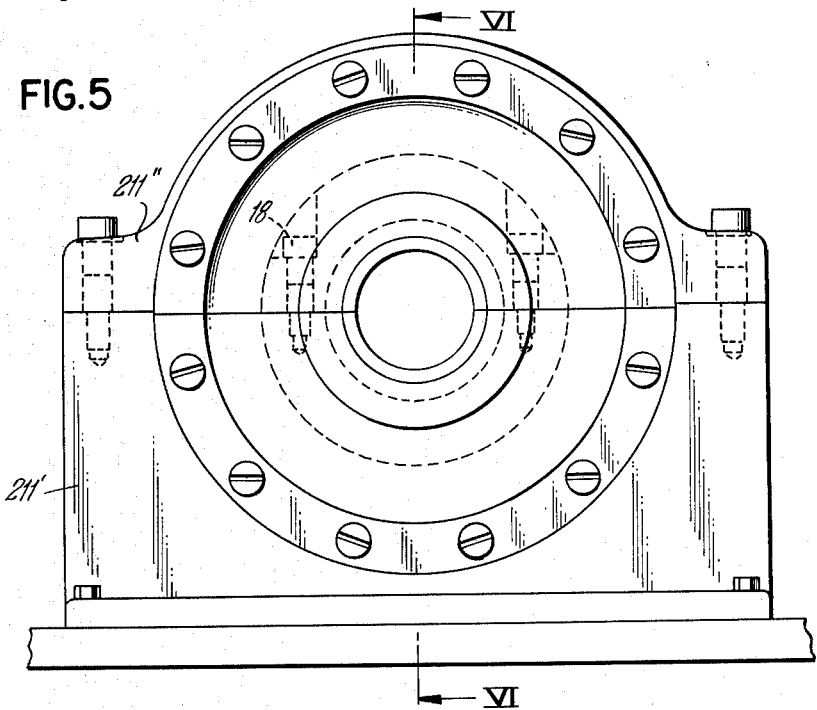
FIG. 5 is an axial view of a third embodiment of which an axial cross section along line VI—VI is shown in FIG. 6, the bearing body and spring members being each horizontally subdivided into two parts, and so combined as to form a single structural unit in each of the respective two half-portions.
Figure 6:
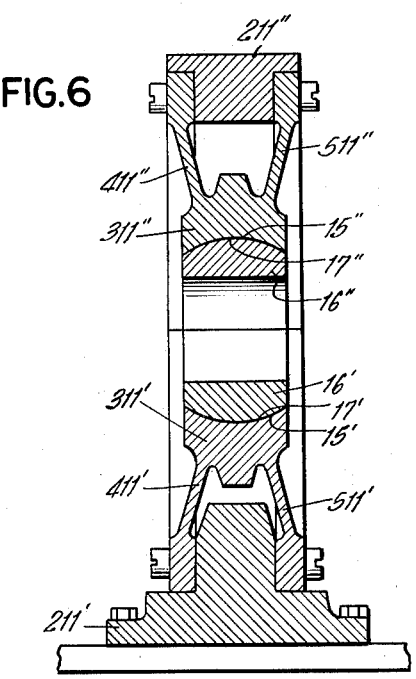

The journalling device according to FIGS. 5 and 6 is horizontally subdivided throughout to form a lower portion 211' and a removable upper portion 211''. Accordingly, the bearing proper of this device comprises a lower portion 311' and an upper portion 311''. The two spring members, being also subdivided, comprise respective lower semi-circular portions 411', 511', which form a single structural piece together with the lower bearing portion 311'. Analogously, the upper semi-circular portions 411'', 511'' of the respective spring members are integral with the upper bearing portion 311''. The two half-portions of the bearing 311', 311'' are provided with respective spherically-concave surfaces 15' and 15'' in snug engagement with the two half portions 16', 16'' of a likewise subdivided insert whose spherical contact surfaces are denoted by 17' and 17'', respectively. The insert has a cylindrical bore for receiving the shaft of the rotor to be journalled and is firmly fastened in the journalling device by means of screw bolts 18 so as to be immovable relative to the bearing 311', 311'' during normal operation. The insert 16', 16'' protects the journalling structure from excessive tumbling moments. In the event of such excessive stresses, the insert can overcome the clamping friction properly adjusted by means of the bolts 18. That is, the insert can move only in the event of tumbling overloads otherwise apt to damage the journalling device.

I claim:

1. A rotor journalling structure for testing machines, comprising a rigid support having a substantially cylindrical opening, a rotor bearing located centrally and coaxially in said opening and defining a main journal axis, two radially rigid but bendingly elastic metallic spring members of generally annular shape joining said bearing with said support and extending coaxially about said main axis, each of said members forming a frusto-conical structure convexly related to the other member and having its extended geometric apex coincident with the center point of said bearing on said main axis, whereby said bearing is capable of tumbling motion about said center point but restrained from rotary motion and axial displacement relative to said main journal axis, said spring members having a locally reduced cross sectional area at a number of localities symmetrically distributed in concentric relation to said axis.

2. A rotor journalling structure for testing machines, comprising a rigid support having a substantially cylindrical opening, a rotor bearing located centrally and coaxially in said opening and defining a main journal axis, two radially rigid but bendingly elastic metallic spring member of generally annular shape joining said bearing with said support and extending coaxially about said main axis, each of said members forming a frusto-conical structure convexly related to the other member and having its extended geometric apex coincident with the center point of said bearing on said main axis, whereby said bearing is capable of tumbling motion about said center point but restrained from rotary motion and axial displacement relative to said main journal axis, said spring members having a number of openings located between said bearing and said structure at respective localities symmetrically and concentrically distributed about said axis.

3. A journalling device for rotors comprising a rigid support, a bearing body having a cylindrical bore defining a main journal axis, two symmetrical spring members of annular shape joining said bearing with said support and extending coaxially about said main axis, said two spring members forming a single integral piece together with said bearing body, each of said members having a substantially frusto-conical shape convex with respect to the other member and having its extended geometric apex coincident with the center point of said bearing body on said journal axis, and each of said members being bendingly elastic but radially rigid, whereby said bearing is capable of elastic tumbling motion about said center point but is restrained from radial and axial displacement relative to said axis.

4. A rotor journalling structure for testing machines, comprising a rigid support having a substantially cylindrical opening, a rotor bearing located centrally and coaxially in said opening and defining a main journal axis, two radially rigid but bendingly elastic metallic spring members of generally annular shape joining said bearing with said support and extending coaxially about said main axis, each of said members forming a frusto-conical structure convexly related to the other member and having its extended geometric apex coincident with the center point of said bearing on said main axis, whereby said bearing is capable of tumbling motion about said center point but restrained from rotary motion and axial displacement relative to said main journal axis, comprising force measuring gages mounted on said respective spring members between said bearing and said structure so as to be responsive to radial forces transmitted from said bearing to said spring members.

5. A rotor journalling structure for testing machines, comprising a rigid support having a substantially cylindrical opening, a rotor bearing located centrally and coaxially in said opening and defining a main journal axis, two radially rigid but bendingly elastic metallic spring members of generally annular shape joining said bearing with said support and extending coaxially about said main axis, each of said members forming a frusto-conical structure convexly related to the other member and having its extended geometric apex coincident with the center point of said bearing on said main axis, whereby said bearing is capable of tumbling motion about said center point but restrained from rotary motion and axial displacement relative to said main journal axis, said spring members having a locally reduced cross sectional area at a number of localities symmetrically distributed in concentric relation to said axis, and two force measuring gages mounted on each of said spring members between said localities on two respective radii perpendicular to each other so as to be responsive to radial forces transmitted from said bearing to said spring member.

References Cited in the file of this patent

UNITED STATES PATENTS

| | | |
|---|---|---|
| 1,821,096 | Hicks et al. | Sept. 1, 1931 |
| 2,050,073 | Thearle | Aug. 4, 1936 |
| 2,353,150 | Dietz | July 11, 1944 |
| 2,461,645 | Kallmann | Feb. 15, 1945 |
| 2,515,799 | Rouy | July 18, 1950 |
| 2,598,599 | Pleasance | May 27, 1952 |
| 2,684,877 | Schneider | July 27, 1954 |
| 2,869,936 | Federn | Jan. 20, 1959 |
| 2,924,977 | Kenyon et al. | Feb. 16, 1960 |
| 2,968,185 | Jacobson | Jan. 17, 1961 |
| 3,034,838 | Abel | May 15, 1962 |

FOREIGN PATENTS

| | | |
|---|---|---|
| 302,061 | Germany | Aug. 4, 1916 |